May 9, 1933.  J. P. LEASK ET AL  1,907,838
PANEL FRONT REGISTER AND WIND BOX
Filed Aug. 18, 1928  2 Sheets-Sheet 1

INVENTOR.
ATTORNEYS.

May 9, 1933.  J. P. LEASK ET AL  1,907,838
PANEL FRONT REGISTER AND WIND BOX
Filed Aug. 18, 1928  2 Sheets-Sheet 2

INVENTORS
ATTORNEYS.

Patented May 9, 1933

1,907,838

UNITED STATES PATENT OFFICE

JOHN P. LEASK, OF GLENBROOK, CONNECTICUT, AND ARLEIGH W. ANDERSON, OF LOS ANGELES, CALIFORNIA, ASSIGNORS TO PEABODY ENGINEERING CORPORATION, A CORPORATION OF NEW YORK

PANEL FRONT REGISTER AND WIND BOX

Application filed August 18, 1928. Serial No. 300,574.

Our invention relates to a sectional wall for boiler furnaces and more particularly to a construction adapted as the front wall of a wind box in installations in which the furnaces are fired with liquid fuel, gas, or pulverized coal, and operated under forced draft.

In known types of fuel burners in which an air register forms part of the equipment such register comprises a front plate and a back plate secured together. Where the furnaces are operated under forced draft the air for combustion is delivered to a wind box, the outer plate of which may be 5 ft. to 10 ft. in height and 25 ft. in length, made up of sections secured together. The size of such plate, particularly where there is a battery of boilers in the installation, leads to difficulties due to expansion and contraction as the plate is in relatively close proximity to the furnace front and the air for combustion, passing through the double front, may be highly preheated. Moreover, it is necessary to cut openings in the plate to accommodate the air registers. This necessarily adds to the cost and is unsatisfactory in practice owing to the warping of the plate.

The object of our invention is to provide a construction which will be free of the objections incident to the plate as heretofore used. The outer plate of the wind box, as constructed by us, is made up of a series of unitary panels in which the front plate of the air register itself forms an essential part. To complete the outer plate, these panels are united in an integral structure by relatively short plates in the manner hereinafter described.

Figure 1:
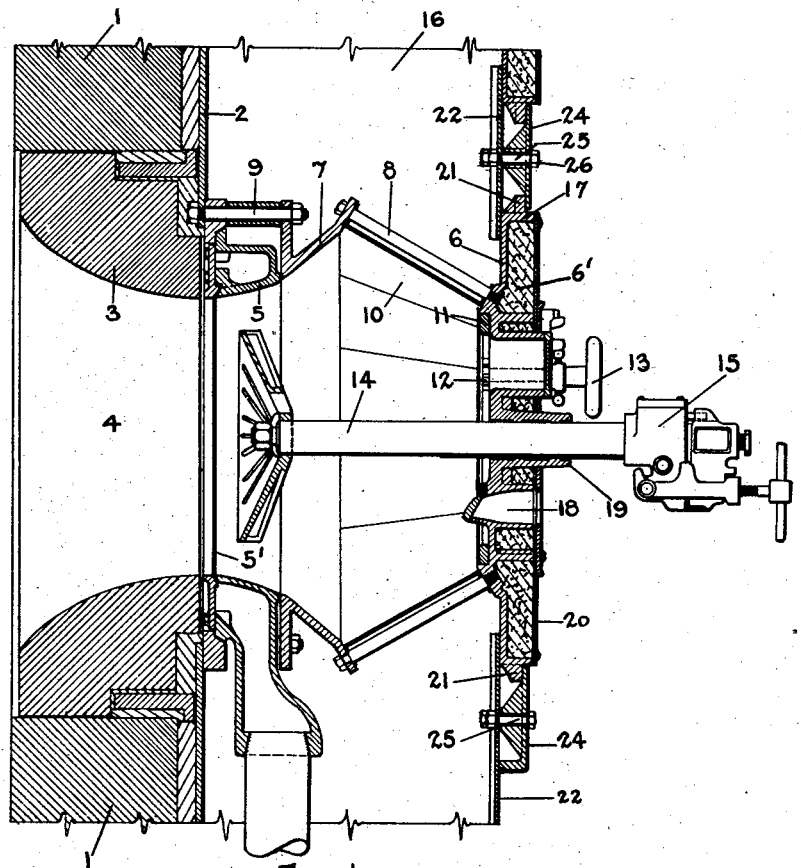
Figure 4:
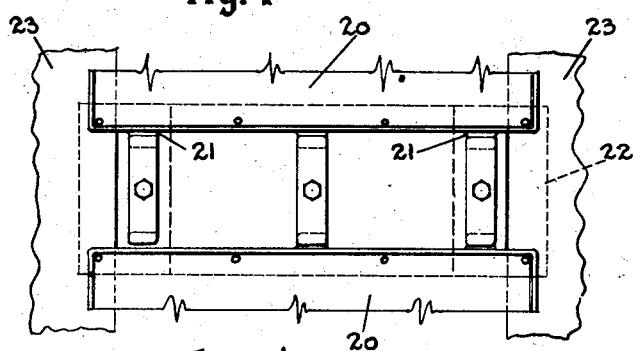
Figure 3:
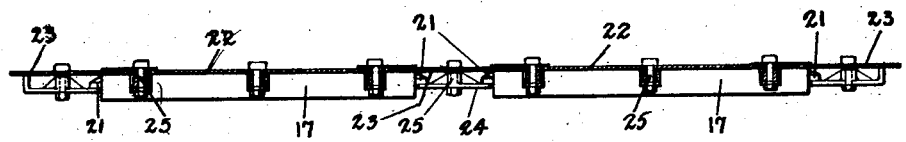
Figure 2:
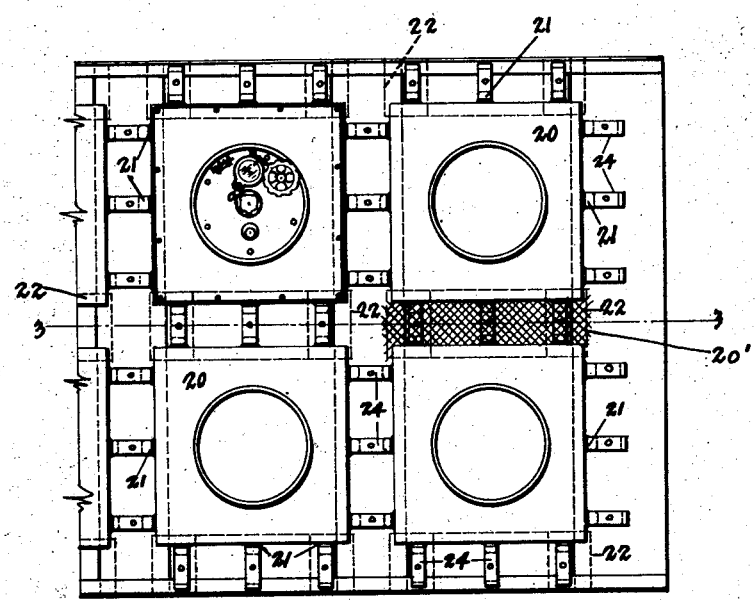
Figure 5:
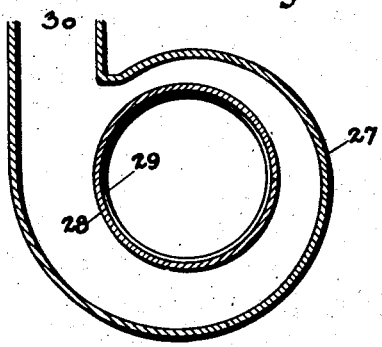

The invention will be understood by reference to the accompanying drawings in which Fig. 1 is a vertical section, certain parts being shown in elevation; Fig. 2 is a front view showing four panels with the uniting plates; Fig. 3 is a horizontal section on the plane of the line 3—3 of Fig. 2; Fig. 4 is an enlarged front view of a portion of Fig. 2 showing more clearly the mode of holding together two of the panels; and Fig. 5 is a section through a burner adapted more particularly for pulverized coal and which may be used as a part of the burner equipment. Similar reference numerals indicate similar parts in the several views.

In order to fully understand the manner of assembly of our improved outer plate, we have shown, as far as may be necessary, in Fig. 1, a burner equipment mounted as in actual practice. Referring to this figure, the numeral 1 indicates a portion of a furnace front wall, having the usual plate 2 secured thereto. The wall 3 of the throat 4 is so built as to increase in diameter from the front to the rear to permit the mixture of fuel and air to expand as it enters the combustion chamber. A burner 5 adapted to burn gas or powdered coal is set to surround the opening into the throat 4, the fuel being discharged through an annular slot 5'.

The air register comprises a front plate 6 and a back plate 7 held together by bolts carrying pipe sleeves 8. The back plate 7 bears against the burner 5 and through a flange thereon bolts 9 are passed which secure the register and the burner 5 in fixed position. The air doors 10 on the register are pivotally mounted on the sleeves 8 and can be moved simultaneously from an open to a closed position, or vice versa, by rotating the ring 11, housed in the inner face of the plate 6. The ring 11 is adapted to be actuated by a pinion 12 and hand wheel 13.

The equipment shown also comprises an oil burner 14 having a yoke coupling 15. This burner as well as the burner 5 and the air register are well known in the art and do not require further description.

The equipment shown is that for a forced draft installation in which the air is delivered to the register through a wind box 16. Instead of an outer plate built up of riveted sections as heretofore, we construct it of panels united into an integral wall as follows. The front plate 6 of the air register is a casting having a peripheral flange 17 and formed with projecting sections to provide for the lighting hole 18, the hand wheel 13, and other parts. The plate 6 is also formed with a hub 19 to provide a bearing for the burner 14.

Secured by screws to the flange 17 is a plate 20 formed with openings for the bearing 19 and lighting hole 18. The space between the two plates is filled with any suitable heat insulating material 6', as shown. The assembly of a plurality of these panels to constitute the outer wall of the wind box is effected in the following manner.

The flanges 17 on the four sides of the plate 6 are formed with a series of lugs 21, three being shown on each side. To close the spaces between the panels are a series of filler pieces 22 set horizontally between panels in the same vertical row, and a series of similar pieces 23 set vertically between panels in the same horizontal row, as shown in Figs. 2 and 4. The pieces 22 are also placed on the extreme upper and lower sides, and pieces 23 along the extreme ends, to complete the closure of the wind box.

The panel units, consisting of the plates 6 and 20, which together constitute the front plate of the air registers, and the pieces 22 and 23 may be secured together to form the outer plate of the wind box by any suitable means. A convenient way of so doing is by the use of dogs 24 set against the outer faces of lugs 21, and bolts 25 which pass through the plates 22 and 23. By tightening the lock nuts 26 on the bolts, the dogs and pieces 22 and 23 will be firmly held against the lugs and plates 6, respectively, thus closing the spaces between contiguous panels and uniting the whole frame work into an integral structure, yet one which allows the various parts to move slightly under temperature changes. As shown in Fig. 2, the exposed portions of plates 22 and 23 may be covered with a heat insulating material 20'.

Access to any one of the air registers may be had by simply removing the filler pieces 22 and 23.

Instead of fuel box 5 shown in Fig. 1, we may use that shown in Fig. 5 when burning pulverized coal. In this, the outer wall 27 is an involute scroll and the inner wall 28 cylindrical. The fuel entering through inlet 30 is discharged through the anular slot 29. The two types of fuel boxes are shown merely to illustrate the adaptation of the front wall to various types of burners.

What we claim is:

1. A structural wall for the purpose described, composed of a plurality of air registers each including a front plate, the registers being arranged with the front plates spaced laterally from adjacent plates, and filler pieces between and connecting said plates to form an integral structure, each plate being so connected to the filler pieces to enable removal of a plate without disturbing the remaining plates on the filler pieces.

2. A structural wall for the purpose described, composed of a plurality of air registers each including a front plate, the registers being arranged with the front plates spaced laterally from adjacent plates, filler pieces between said plates, and means for holding said pieces in contact with said plates to form an integral structure, each plate being so connected to the filler pieces to enable removal of a plate without disturbing the remaining plates on the filler pieces.

3. A structural wall for the purpose described, composed of a plurality of air registers each including a front plate, the registers being arranged with the front plates spaced laterally from adjacent plates, filler pieces between contiguous front plates, and means for clamping said plates and filler pieces together, the clamping means for each plate being so arranged as to enable removal of a plate without disturbing the remaining plates on the filler pieces.

4. A structural wall for furnaces consisting of an inner portion and means for securing the same to a furnace front, an outer portion spaced from the inner portion, said outer portion comprising a plurality of panels made up of plates spaced apart and secured together by suitable means, a heat insulating material between said plates, and filler pieces between and secured to said panels to form an integral structure.

5. A structural wall for furnaces having inner and outer portions, means for securing the inner portion to a furnace front, the outer portion comprising a series of unitary panels, air registers supported between said panels and the inner portion of the wall, said panels constituting the front plates of said registers, and filler pieces between and secured to said panels.

6. A structural wall for furnaces consisting of inner and outer portions spaced apart to provide an inclosure into which combustion air may be delivered, the inner portion of the wall having openings therein for the delivery of fuel and combustion air to the furnace, a plurality of air registers supported between the inner and outer portions of the wall and in proximity to the openings in the inner portion of the wall, said air registers having hollow front plates with heat insulating material in the hollow spaces, and filler plates between said front register plates to complete the outer portion of the structural wall.

Signed at New York, in the county of New York and State of New York, this 30th day of July, A. D. 1928.

JOHN P. LEASK.

Signed at Los Angeles, in the county of Los Angeles and State of California, this 9th day of August, A. D. 1928.

ARLEIGH W. ANDERSON.